Oct. 11, 1955 A. HASBROUCK 2,720,370
RESILIENT ENGINE MOUNTING SYSTEM INCLUDING
FLEXIBLE SELF-COMPENSATING JOINTS
Filed Dec. 4, 1950
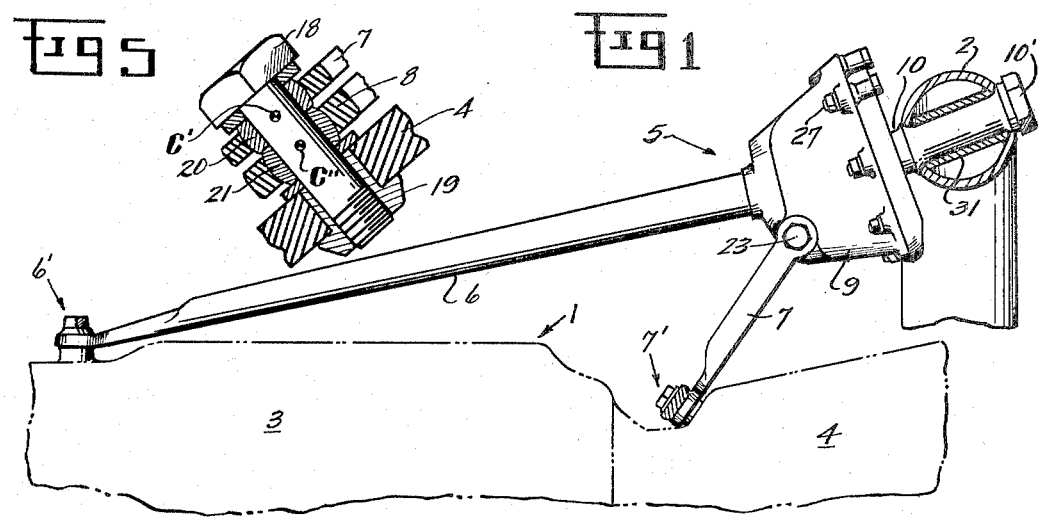
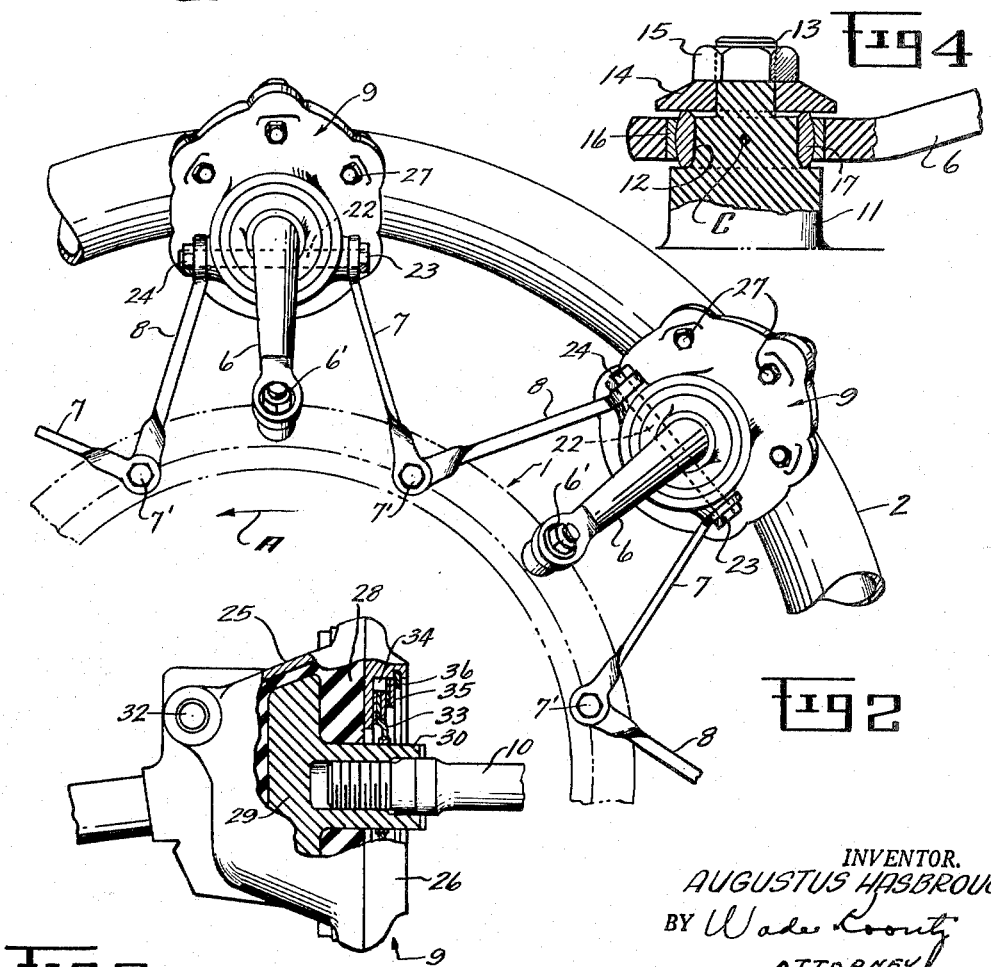
INVENTOR.
AUGUSTUS HASBROUCK United States Patent Office 2,720,370
Patented Oct. 11, 1955

2,720,370

RESILIENT ENGINE MOUNTING SYSTEM, INCLUDING FLEXIBLE SELF-COMPENSATING JOINTS

Augustus Hasbrouck, Middletown, Conn.

Application December 4, 1950, Serial No. 198,927

2 Claims. (Cl. 248—5)

The present invention relates to an engine mounting system including flexible self-compensating joints, particularly at the points of attachment to the engine structure.

The primary object of the invention is to provide a resilient engine mounting device including joints capable of limited universal movement to compensate for small dimensional changes in the engine structure due to inaccuracies in manufacture and due to thermal expansion and contraction of the engine crankcase and parts receiving heat from the engine during operation thereof.

A further object of the invention is to provide an engine mounting system for a radial cylinder aircraft engine including a plurality of similar mounting assemblies evenly distributed around the engine with each assembly including a main supporting strut and a pair of auxiliary struts all secured to a resilient cushioning device fastened to the aircraft frame and further including universal ball-and-socket joints at the points where each of the struts attaches to the engine itself, to accommodate the engine mounting system to engines having dimensional variations due to manufacturing differences and due to thermal expansion and contraction of the engine.

Another object of the invention is to provide an engine mounting system for a radial cylinder aircraft engine of the kind having a blower assembly and casing attached to the engine crankcase at the rearward end of the crankcase, wherein the mounting system includes a plurality of similar mounting assemblies evenly distributed around the engine with each assembly including a main supporting strut of substantial length adapted to be secured to the engine crankcase and a pair of shorter auxiliary mounting struts adapted to be secured to the blower casing with all of the struts of each assembly being secured to a resilient cushioning device fastened to the aircraft frame and further including universal joints at the points where the main struts attach to the engine crankcase and where the auxiliary struts attach to the blower casing, to accommodate the engine mounting system to engines having dimensional variations due to manufacturing inconsistencies and due to thermal expansion and contraction of the engine and mounting assemblies.

Another object of the invention is to provide a resilient engine mounting system including mounting struts extending from a fixed mounting ring to the engine and attached to the engine by means of universal self-compensating joints adapted to accommodate the engine mounting system to engines having dimensional variations due to manufacturing inconsistencies and due to thermal expansion and contraction of the engine and mounting system elements.

The above and other objects of the invention will become apparent on reading the following detailed description in conjunction with the drawing, in which:

Fig. 1 is a side elevation view of one engine mounting assembly making up the present mounting system.

Fig. 2 is a fragmentary front elevation view of an aircraft engine secured to an engine mounting ring by means of the present mounting system.

Fig. 3 is an elevation view partly in cross section of one resilient cushioning element of the present engine mounting system.

Fig. 4 is a cross sectional view of a universal joint used to secure a main mounting strut to the engine.

Fig. 5 is a cross sectional view of a tandem universal joint used to secure two auxiliary mounting struts to the engine.

Referring now to the drawing the engine mounting system is intended primarily for use in mounting a radial type aircraft engine 1 on a mounting ring 2 rigidly connected to the aircraft frame structure. The engine in this instance includes a hollow crankcase 3 on which the radially extending cylinders (not shown) are mounted, and a blower casing 4 secured to the crankcase at the rearward side thereof. In order to connect the engine and mounting ring, a plurality of engine mounting assemblies 5 are provided in evenly spaced arrangement around the engine. Each of these assemblies includes a main supporting strut 6, a pair of auxiliary supporting struts 7 and 8, a cushioning device 9 and an anchor strut 10. The arrangement of the engine mounting assemblies with respect to the engine is preferably planned so that for each space between the radial cylinders there is one engine mounting assembly. Thus if the engine includes nine cylinders evenly spaced around the crankcase there will be nine engine mounting assemblies and the main supporting struts 6 will extend forwardly between the cylinders for anchoring to the crankcase as at 6'. The auxiliary struts provided in pairs 7 and 8 are attached to the blower casing 4 as at 7'. As shown in Fig. 2 each of the attaching means 7' serves the dual purpose of anchoring a strut 7 of one engine mounting assembly and a strut 8 of an adjacent engine mounting assembly.

Considering now only a single one of the engine mounting assemblies it is noted that the main strut 6 is attached to the crankcase by means of a stud 11 rigidly connected to the crankcase. The stud 11 is of reduced diameter at 12 to receive the apertured strut and still farther outwardly the stud is reduced at 13 and threaded to be received in a washer 14 and a nut member 15. The attached end of the strut is apertured to receive a bushing 16 having a spherical inner surface nicely fitting around a rounded bearing member 17 which is fitted over the stud portion 12 and held rigidly in position by the washer 14 and nut 15. It is particularly noted that the axial dimension of the bearing member 17 is substantially greater than the thickness of strut 6 and bushing 16, so as to permit limited universal movement of the strut with respect to the stud 11. The center of rotation C will always be at the intersection of the central axis of the stud and the medial plane of the flattened attaching end portion of the strut 6. The bushing 16 is rigidly fixed to the strut 6 as by welding, drive fit or shrunk fit. The bearing member 17 is assembled with respect to the bushing 16 by a rotary motion, one edge portion of the bushing being cut away to allow entry of the bearing before the rotary assembly operation.

At each of the attaching points 7' of the struts 7 and 8 there is provided a stud bolt 18 which threads securely into a bushing-like member 19 on the blower casing 4. Securely retained around the shank of the stud bolt 18 is a pair of bearing members 20 and 21 each having a spherical outer surface and being received in spherically shaped recesses in the ends of the auxiliary struts 7 and 8. The axial thickness of the bearing members 20 and 21 is substantially greater than the thickness of the strut ends, so that the struts may have limited universal movement with respect to the centers of rotation C' and C'', as indicated in Fig. 5, these centers being on the central axis of the stud bolt 18 just as the center of rotation C is on the central axis of the stud 11. In passing it is noted that the thickness of the struts 7 is less than that of the struts 8, because the engine torque will cause a compression stress in the struts 8 requiring greater stiffness in these struts. The struts 7 on the other hand will always be under a tension stress and will have no tendency to buckle. This arrangement assumes that the engine will be rotating in the direction of the arrow A, looking at the front of the engine. The torque reaction on the engine crankcase and mounting system will be in a direction opposite to that of the direction of engine rotation. Thus in the present case the engine crankshaft will rotate in a counterclockwise direction but the torque reaction will be in a clockwise direction to place the struts 8 in compression and the struts 7 in tension. Each pair of auxiliary struts 7 and 8 is rotatably secured to the cushioning device 9 by means of a shaft 22 passing transversely through the housing of the cushioning device 9 and having head elements 23 and 24 on opposite ends to prevent axial movement of the shaft means.

The cushioning device 9 (see Fig. 3) comprises a cup-like housing 25 having a cover plate 26 bolted thereto by means of stud bolts 27. The metallic housing 25 encloses circular rubber block 28 in which is imbedded an anchor member 29 having an internally threaded stem 30 projecting rearwardly through a central opening in the cover plate 26. Threadedly connected to the stem 30 is the anchor strut 10 passing through the mounting ring 2 and having a headed end portion 10' thereon. At the point where the strut 10 passes through the mounting ring 2, this ring is strengthened by a section of metal tubing 31 preferably welded to the ring walls. As may be seen in the drawing the main strut 6 is rigidly connected to the forward end of the housing 25 as by means of a screw threaded connection for instance. The transverse shaft 22 for rotatably mounting the auxiliary struts 7 and 8 on the housing 25 passes through the bore 32 in the housing.

Another feature incorporated in the resilient cushioning devices 9 is the vibration dampening means extending between the stem 30 and the cover plate 26. A washer-like disk 33 having friction facings on each side is secured on the stem 30 and the inner friction facing directly contacts the outside of the cover plate 26 within the counterbored opening 34. Superimposed over the marginal side portions of the disk 33 is a friction ring 35 held in place as shown by an expansible snap ring 36, which fits into an annular recess within the counterbored opening 34. This construction tends to dampen excessive vibration, especially at engine idling speeds.

The mounting assemblies provide cantilever beams attached to the engine mounting ring 2 and extending forwardly therefrom to support the engine assembly at a multiplicity of points distributed evenly around the engine assembly. Included in each mounting assembly is a resilient cushioning device which tends to isolate and absorb engine vibration and relieve the engine mounting ring as well as the aircraft frame of fatigue stresses. The points of attachment of the mounting struts of each mounting assembly to the engine crankcase and blower casing include universal joints of a particular construction allowing limited universal movement and affording automatic or self-adjusting compensation for variations in the size of the engine as well as variations in the location of securing studs and mounting assembly elements secured to the studs. Every engine crankcase and blower casing is certain to be slightly different in portions thereof and the universal joints provided in the present mounting assemblies will compensate for these differences without causing initial and uneven stresses in the engine casing and mounting assemblies. Furthermore after the engine is put in operation there is uneven heating of the engine, particularly due to the heat transferred from the engine cylinders to the engine crankcase, while the blower casing remains comparatively cool. Thus the thermal expansion of the engine casing will be uneven and the universal joints as referred to above will provide compensation or self-adjustment to prevent large stresses from developing in certain portions of the engine casing, as well as in certain ones of the mounting struts. This automatic compensating action whereby stresses are relieved and more evenly distributed around the whole assembly produces the desirable result of improving the fatigue resistance of the engine crankcase and blower casing by relieving concentrated stresses, which in an aircraft engine of the reciprocating piston type are always alternating or vibratory stresses. Fatigue failure of a structure may be defined as a failure resulting from long continued or frequently repeated stress, particularly continued reversals of stress. The chance of producing fatigue failure increases as the magnitude of the stress increases.

Considering a particular situation in the engine herein illustrated, it will be seen that heating of the crankcase 3 will cause a circumferential expansion and also a longitudinal expansion but the blower casing 4 will remain comparatively cool with little dimensional change. The result of this situation will be the outward and forward displacement of the strut attachment points 6', while the strut attachment points 7' will remain in about the same relative positions as in the cold condition of the engine. As the points 6' move forwardly, the cushioning devices 9 will be drawn forwardly also very slightly and the auxiliary struts 7 and 8 will pivot about shafts 22 and the attachment ends thereof at points 7' will turn slightly on the spherical bearing members 20 and 21. As the points 6' move outwardly slightly in a radial direction, the attachment ends of the main struts 6 will rotate very slightly on the spherical bearing members 17. The effects of dimensional changes due to heating and cooling may be predicted with reasonable certainty but dimensional variations caused by manufacturing methods are not subject to exact evaluation. Nevertheless the present engine mounting assembly will usually provide for self-adjustment of the engine to the mounting arrangement, as long as the imperfections and deviations in the parts are not unduly exaggerated.

It is noted that mounting ring 2 is substantially concentric with respect to the central torque axis of the engine, in accordance with the usual practice. It is also noted that the major portion of the engine extends forwardly of the mounting ring, so that in the completely mounted engine the center of gravity of the engine will be spaced substantially ahead of the mounting ring 2. The center of gravity of a radial cylinder engine will always fall approximately on the torque axis of the engine because of the inherent symmetry of this type of internal combustion engine.

The embodiments of the invention herein shown and described are to be regarded as illustrative only and it is to be understood that the invention is susceptible of variations, modifications and changes within the scope of the appended claims.

I claim:

1. A resilient mounting system for attaching a radial cylinder internal combustion engine to a stationary mounting ring concentric with respect to the central torque axis of the engine and having its central plane spaced axially from the engine center of gravity, comprising a mounting ring, a plurality of mounting assemblies adapted to be arranged around an engine, each mounting assembly comprising an anchor strut fixed to said ring and extended inward at an acute angle with respect to the plane of said ring, a cup-like housing, a rubber filler element within said housing with the extending end of said anchor strut firmly embedded in said filler element, an elongated main engine supporting strut rigidly connected to said housing and extending therefrom in a direction opposite to that of said anchor strut, a universal joint for connecting each of the main engine supporting struts to an engine, a pair of similar auxiliary engine supporting struts pivotally mounted on said housing at opposite sides thereof and disposed at an acute angle with respect to the main engine supporting strut, a strut connecting stud between each of said mounting assemblies, a pair of apertured bearing elements having spherical outer surfaces and secured in superimposed relation on said stud, and means on the extending ends of an adjacent pair of said auxiliary struts associated with a pair of adjacent mounting assemblies fitting around said pair of bearing elements to form universal joints capable of limited universal movement.

2. In a resilient mounting system for attaching and supporting a radial cylinder internal combustion aircraft engine to a stationary mounting ring, said engine having a central torque axis, said ring being adapted to be fixed on an aircraft with the ring positioned substantially concentric to the central torque axis of the engine and spaced axially from the center of gravity of the engine with the torque axis substantially perpendicular to the plane of the ring, said mounting system comprising a plurality of engine mounting assemblies adapted to be connected between the engine and the ring in substantially uniform spaced relation around the torque axis of the engine, each engine mounting assembly comprising an anchor strut fixed to the mounting ring and having an axis extending toward the torque axis and center of gravity of the engine, said axis of the anchor strut being directed at an acute angle to said mounting ring, an elongated main engine supporting strut, a housing including a resilient connecting means between the main engine supporting strut and an end of said anchor strut for firmly and resiliently securing the main engine supporting strut and said anchor strut together with said supporting strut inclining away from said anchor strut toward said engine torque axis at a greater acute angle to the mounting ring than that of said anchor strut, a universal joint connecting means at the outer end of each of the main engine supporting struts for connecting the end of each of said main engine supporting struts to the engine at circumferentially spaced points around the torque axis of the engine, a pair of elongated auxiliary engine supporting struts for each of said anchor struts, shorter in length than said main engine supporting struts, pivot means on said housing, said pivot means projecting on opposite sides of the housing adjacent said resilient connecting means and connecting each pair of said auxiliary engine supporting struts for swinging movement through diverging planes at opposite sides of said main engine supporting strut, said auxiliary struts being disposed in an acute angular relation to said main engine supporting strut and to the plane of said mounting ring, a universal joint connecting means at the free ends of said auxiliary struts for universal pivotal connection to the engine in spaced relation to the main engine supporting strut and at opposite sides thereof and located on an axis disposed substantially perpendicular to the common pivotal axis of the said auxiliary struts.

References Cited in the file of this patent

UNITED STATES PATENTS

| | | |
|---|---|---|
| 2,342,577 | Gehman | Feb. 22, 1944 |
| 2,411,562 | Thompson | Nov. 26, 1946 |
| 2,457,340 | Berry | Dec. 28, 1948 |
| 2,477,501 | Tyler et al. | July 26, 1949 |
| 2,565,733 | Korsberg | Aug. 28, 1951 |

FOREIGN PATENTS

| | | |
|---|---|---|
| 468,578 | Great Britain | July 8, 1937 |